US007230976B2

United States Patent
Holt et al.

(10) Patent No.: US 7,230,976 B2
(45) Date of Patent: Jun. 12, 2007

(54) PRE-CORRUPTING REFERENCE SIGNALS WITH INTER-SYMBOL INTERFERENCE

(75) Inventors: Keith Holt, El Dorado Hills, CA (US); William J. Chimitt, Folsom, CA (US); Sudhakar Kalluri, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 744 days.

(21) Appl. No.: 10/300,134

(22) Filed: Nov. 20, 2002

(65) Prior Publication Data

US 2004/0096017 A1    May 20, 2004

(51) Int. Cl.
- H04B 1/00 (2006.01)
- H04B 7/216 (2006.01)
- H04L 27/06 (2006.01)
- H04J 13/00 (2006.01)

(52) U.S. Cl. ............ 375/150; 375/148; 375/233; 375/343; 370/342; 370/479

(58) Field of Classification Search ........... 375/340, 375/343, 342–4, 148, 150, 152, 233; 370/342, 370/335, 441, 479
See application file for complete search history.

(56) References Cited

U.S. PATENT DOCUMENTS

| | | | | |
|---|---|---|---|---|
| 5,631,921 A | * | 5/1997 | Schilling | 375/130 |
| 5,909,471 A | * | 6/1999 | Yun | 375/343 |
| 6,198,763 B1 | * | 3/2001 | Inoue et al. | 375/130 |
| 6,233,273 B1 | * | 5/2001 | Webster et al. | 375/148 |
| 6,278,732 B1 | * | 8/2001 | Beidas et al. | 375/235 |
| 6,546,113 B1 | * | 4/2003 | Lucas et al. | 382/100 |
| 6,735,188 B1 | * | 5/2004 | Becker et al. | 370/342 |
| 7,017,104 B1 | * | 3/2006 | Chen et al. | 375/341 |
| 2002/0141485 A1 | * | 10/2002 | Mimura | 375/147 |
| 2004/0091023 A1 | * | 5/2004 | Chen et al. | 375/148 |

FOREIGN PATENT DOCUMENTS

WO    WO 02/080395 A1 * 10/2002

* cited by examiner

Primary Examiner—David C. Payne
Assistant Examiner—Aslan Ettehadieh
(74) Attorney, Agent, or Firm—Trop, Pruner & Hu, P.C.

(57) ABSTRACT

In one embodiment, an apparatus includes a correlator unit that generates a set of correlator outputs and a codeword selector coupled to the set of correlator outputs to determine a received codeword therefrom. The correlator unit may have reference signals pre-compensated with intra-codeword interference.

6 Claims, 7 Drawing Sheets

PRE-CORRUPTING REFERENCE SIGNALS WITH INTER-SYMBOL INTERFERENCE

BACKGROUND

The present invention relates to wireless communication systems, such as a wireless local area network (WLAN).

WLANs based on the IEEE 802.11b standard, IEEE std. 802.11b-1999 (published Sep. 16, 1999) (also known as "WiFi") are beginning to proliferate homes and businesses to provide data communications to roaming devices, such as notebook computers, personal digital assistants, advanced cellular telephones, and the like. Although the IEEE standard promises 11 megabit per second (Mbps) performance with a reach of hundreds of feet, in typical use, due to the presence of noise and multipath inter-symbol interference (ISI), performance fails to achieve this objective.

Wireless channels suffer from two main impairments, multipath induced ISI and additive noise. Multipath induced ISI occurs when energy from a transmitter to a receiver arrives via multiple paths. When the difference in propagation time among the paths is large relative to a symbol period, any sample in time can contain energy from multiple transmitted signals.

Two types of ISI exist in block-coded communications: "inter-codeword interference" and "intra-codeword interference." Inter-codeword interference is energy from symbols in one codeword that spreads into the symbols of another codeword, while intra-codeword interference is energy from symbols in one codeword that spreads into symbols within that same codeword.

While different measures may be used to detect in the presence of noise and ISI, such as a rake receiver, a decision feedback equalizer (DFE), or a DFE with an embedded or cascaded block detector, drawbacks exist. Some measures do not resolve both additive noise and ISI, while others do not resolve both intra-codeword and inter-codeword interference. Still others are not computationally efficient. Thus a need exists to improve robustness of detection in the presence of noise and ISI in a computationally efficient manner.

DETAILED DESCRIPTION

In block-coded communications, block-coded modulation improves performance in the presence of noise by constraining a set of valid codewords to a subset of all possible codewords. For example, in accordance with the IEEE 802.11b standard, complimentary code keyed (CCK) block code modulated transmissions occur at high rates of 5.5 and 11 Mbps. The CCK codewords are made up of eight quadrature phase shift key (QPSK) symbols. In the 11 Mbps mode of the IEEE 802.11b standard, a subset of 64 out of a possible 65536 codewords was selected.

Demodulating these block-coded transmissions requires detecting which of the 64 codewords was sent. The codewords can be sent in one of four phases. A block detector may be used to demodulate such transmissions. Such a block detector may include a bank of correlators matched to the codewords followed by a selector, which determines the received codeword and phase by observing the correlator outputs.

In one embodiment of the present invention, a modified block detector is provided that may be used in a receiver of block-coded communications. In one embodiment, such a block detector may be used in a receiver having a DFE to embed block decoding within the DFE. Embodiments incorporating the modified block detector delay making decisions on codewords received until after the block detector analyzes successive time windows of an input signal. In so doing, the receiver may benefit from block coding gain and knowledge of channel characteristics for ISI estimation and removal.

Figure 1:
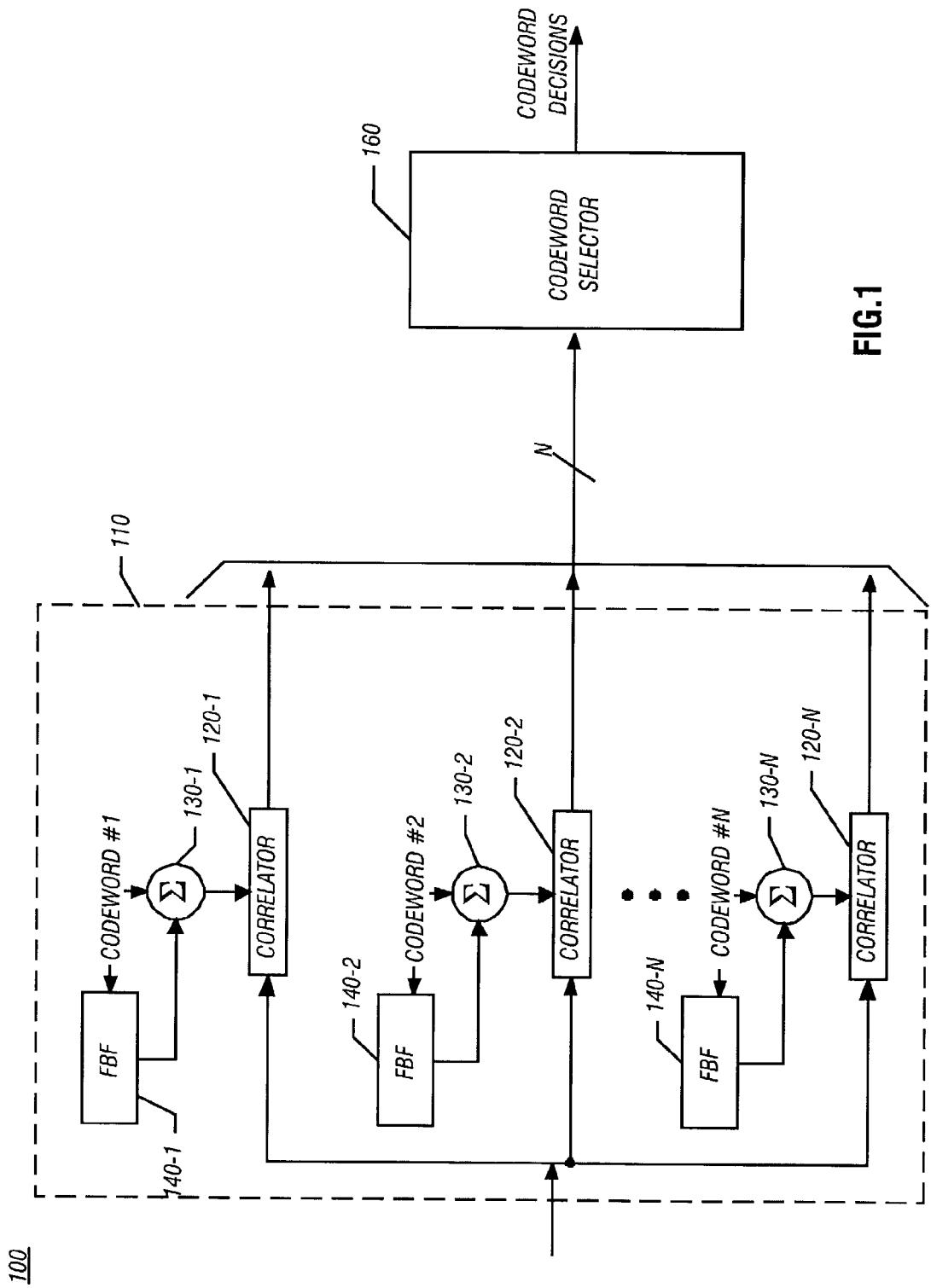
FIG. 1 is a block diagram of a block detector in accordance with one embodiment of the present invention.

Referring now to FIG. 1, shown is a block diagram of a block detector 100 in accordance with one embodiment of the present invention. In this embodiment, block detector 100 includes a codeword correlator unit 110 and a codeword selector 160.

Correlator unit 110 receives successive time windows of an input signal (hereafter the "input signal" or "input signals") from data packets obtained by a receiver to which it is coupled. These signals may correspond to codewords received by the receiver. In certain embodiments, correlator unit 110 may receive input signals after certain signal processing has been performed. Within correlator unit 110, the input signals may be provided to correlators 120-1 to 120-N (generically referred to as "correlator 120"). Also included in correlator unit 110 may be combiners 130-1 to 130-N (generically referred to as "combiner 130"), and finite impulse response (FIR) feedback filters 140-1 to 140-N (generically referred to as "feedback filter 140"). Additionally, correlator unit 110 may include codewords (codewords #1 to #N) which represent the valid codewords (i.e., the "codeword set") of the block-coded communication scheme.

As shown in the embodiment of FIG. 1, each correlator 120-1 to 120-N may be associated with a preselected one of the valid codewords of the block-coded communication scheme. That is, each correlator is associated with a different codeword of the codeword set. While the number of such correlators (and hence the number of corresponding combiners and feedback filters) may vary in different embodiments, for CCK transmissions having 64 possible codewords each encoded at one of four possible quadrature phases, 64 correlators (and corresponding combiners 130 and feedback filters 140) may be present. These correlators and their corresponding components may be referred to collectively as a correlator bank or a filter bank.

Correlators 120 may be coupled to receive the input signals and the output of corresponding combiner 130. The output of combiner 130 is a reference signal to which correlator 120 compares the input signals. In the embodiment of FIG. 1, combiners 130 may be coupled to receive the output of corresponding feedback filter 140 and the corresponding codeword (i.e., one of codewords #1 to N).

Feedback filters 140 may be coupled to receive a corresponding codeword. For example, shown in FIG. 1, feedback filter 140-1 is coupled to receive codeword #1, feedback filter 140-2 is coupled to receive codeword #2, and so forth. Feedback filters 140 may be designed such that their output estimates distortion induced by the channel. In other words, each feedback filter 140 uses the reference codeword, channel function, and a front end filter (discussed below) to estimate intra-codeword interference. In one embodiment, this distortion may be the expected intra-codeword interference for the input signal. In such an embodiment the expected intra-codeword interface may be an estimation of the intra-codeword interference that would be present if the corresponding codeword of the codeword set was the codeword received. Thus combiner 130 adds expected intra-codeword interference to the associated codeword so that the output of combiner 130 (i.e., the reference signal for correlator 120) is the codeword pre-distorted with intra-codeword interference. In one embodiment, the pre-distortion may be based on measured channel response and front end filter design as obtained during a learning phase of the packet communication.

Thus the output of combiners 130 may be pre-compensated for intra-codeword interference associated with the corresponding codeword. That is, the reference signals may be matched to the codewords pre-distorted or pre-corrupted with intra-codeword interference. Because intra-codeword interference is a function of the current codeword, the channel impulse response, and the front end filter design, the front end filter and the pre-corrupted inputs to the correlators (i.e., the reference signals) may be calculated one time per data packet received. In certain embodiments, this calculation may be done after channel estimation and before data demodulation.

In operation of the embodiment of FIG. 1, correlators 120 compare the input signals to the reference signals. Thus the correlator 120 having the largest magnitude may provide an indication of the codeword received. The outputs from correlators 120-1 to 120-N (which may be complex numbers) are sent to codeword selector 160, which makes a codeword decision based on the correlator outputs. In one embodiment, codeword selector 160 may generate an index corresponding to the correlator 120 having the largest magnitude real or imaginary component. The index, which is a hard codeword decision, is provided to other circuitry for further signal processing.

Figure 2:
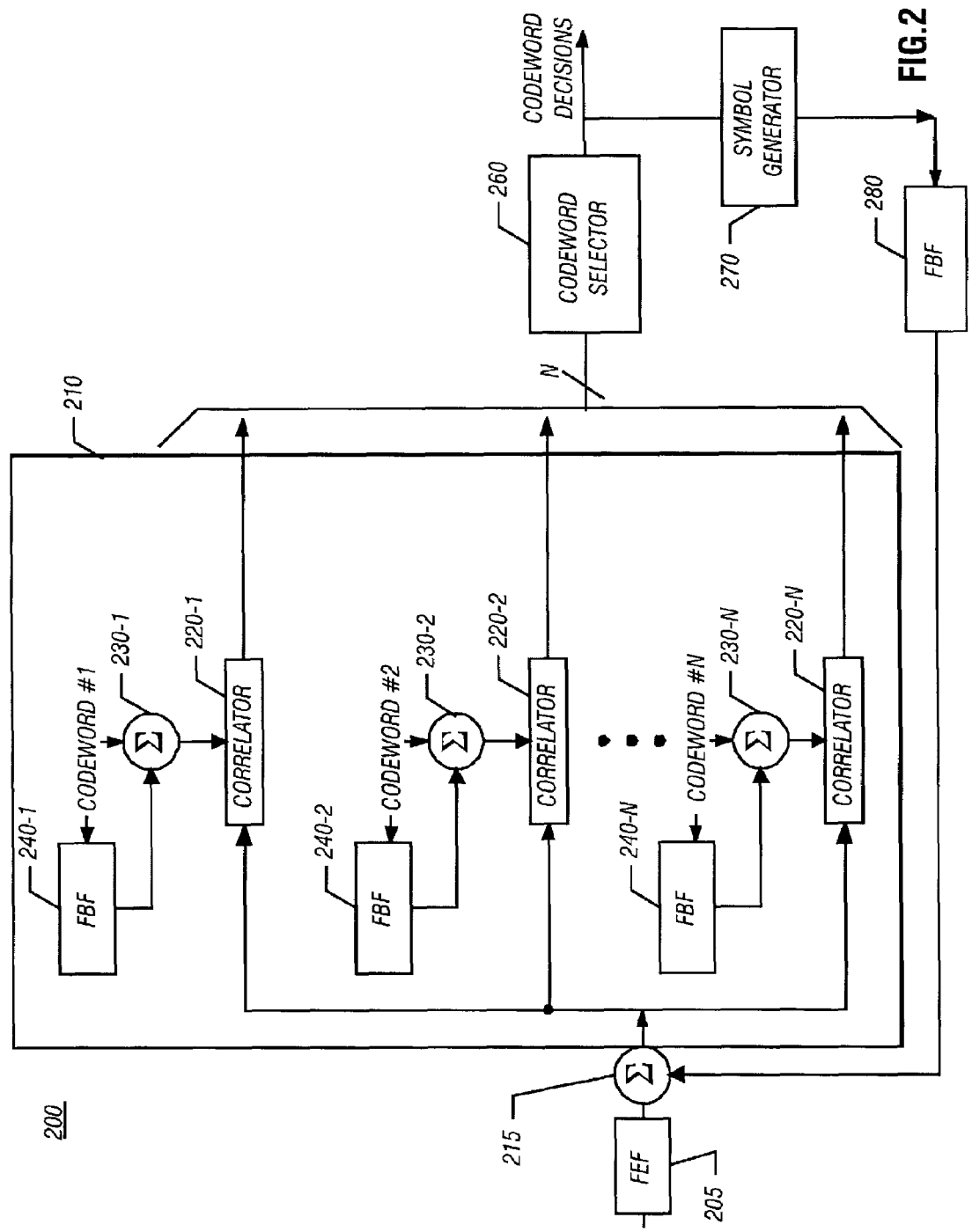
FIG. 2 is a block diagram of a decision feedback equalizer in accordance with one embodiment of the present invention.

Referring now to FIG. 2, shown is a block diagram of a DFE using the block detector of FIG. 1 in accordance with one embodiment of the present invention. As shown in FIG. 2, DFE 200 includes front end filter 205, combiner 215, correlator unit 210, codeword selector 260, symbol generator 270, and FIR feedback filter 280.

In operation of this embodiment, incoming signals are input into front end filter 205. The incoming signals may be obtained from any desired receiving source, and may be input into front end filter 205 after certain signal processing has been performed. In one embodiment, front end filter 205 may be a feed forward filter designed to have whitened noise and a causal response at its output. This output is provided as a first input to combiner 215. In other embodiments, front end filter 205 may be a channel matched filter or other type of filter.

Combiner 215 has a second input to receive the output of feedback filter 280. Combiner 215 subtracts the output of feedback filter 280, which is a signal representative of inter-codeword interference, from the output of front end filter 205. The resulting output of combiner 215 is a signal representative of a received codeword. In various embodiments, this signal may have reduced or canceled inter-codeword interference. The output of combiner 215 is passed to correlator unit 210 as the input signal.

In the embodiment shown in FIG. 2, correlator unit 210 is identical to correlator unit 110, and the numerical designations therein, namely correlator 220, combiner 230, and feedback filter 240 indicate components identical to those discussed above regarding FIG. 1.

The outputs of correlator unit 210 are passed to codeword selector 260. As discussed above, codeword selector 260 makes a hard codeword decision based on the correlator outputs. In one embodiment, the codeword decision may be represented by an index that may be sent to symbol generator 270, which generates a set of symbols corresponding to the codeword and phase determined by codeword selector 260. These symbols may then be provided to feedback filter 280. The filtered symbols are provided in a feedback loop to combiner 215 to remove inter-codeword interference from the signals provided to correlator unit 210. It is to be understood that in various embodiments, the filters discussed above, namely front end filter 205, feedback filters 240, and feedback filter 280 may have coefficients calculated in the same manner as a conventional DFE. In certain embodiment, feedback filters 240 and feedback filter 280 may have identical coefficients.

Figure 3:
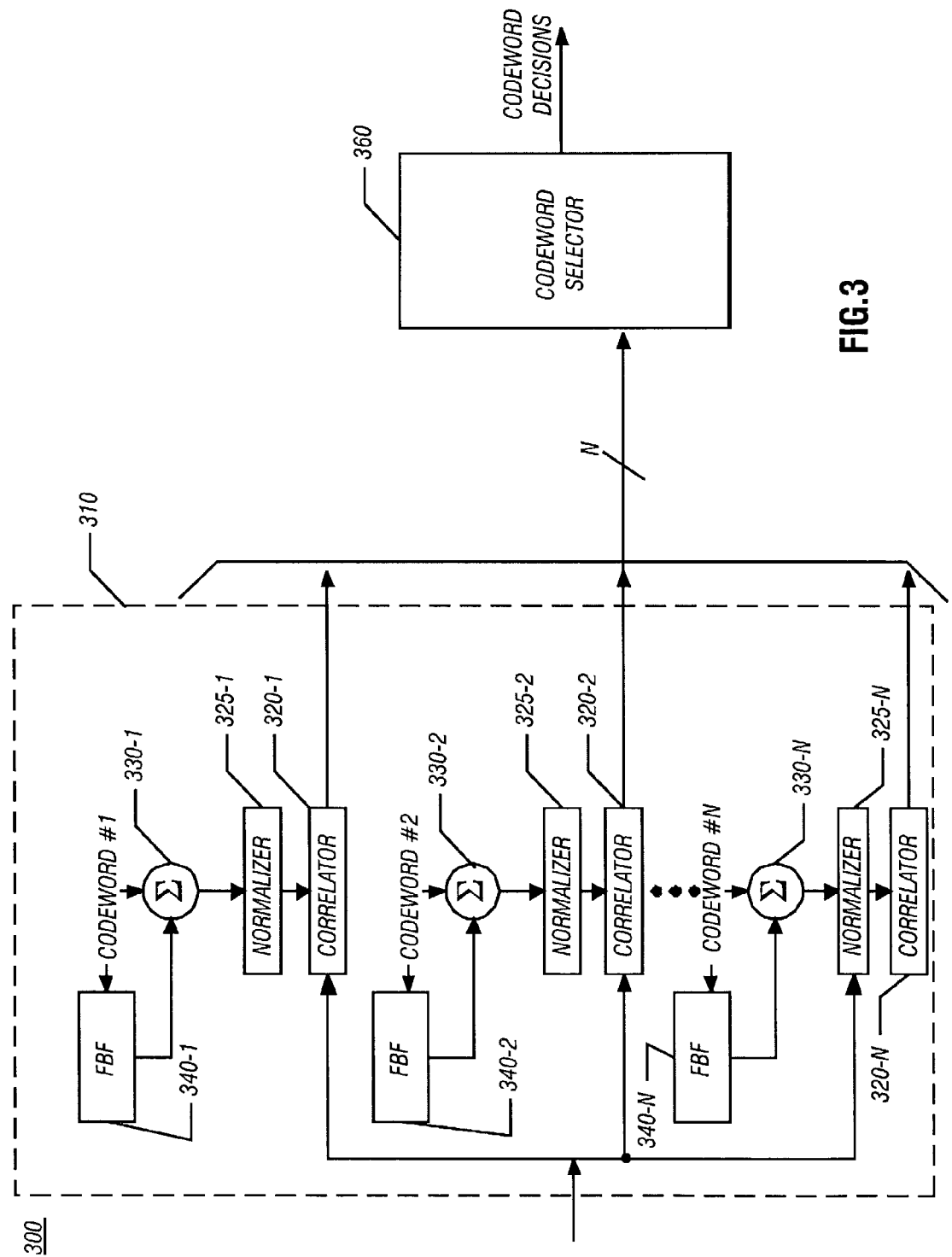
FIG. 3 is a block diagram of a block detector in accordance with another embodiment of the present invention.

FIG. 3 is a block diagram of a block detector in accordance with a second embodiment of the present invention. As shown in FIG. 3, block detector 300 is similar to block detector 100, with the addition of a normalizer located in the signal processing path between the combiner and correlator. For example, with reference to the top correlator, normalizer 325-1 (generically "normalizer 325") is located between combiner 330-1 and correlator 320-1. In one embodiment, normalizer 325 may be used to normalize the pre-corrupted codewords to have equal energy to remove any biasing in the correlation. Without normalization, correlator outputs may be biased by the energy of the reference signal. As a result, receiver performance may be reduced. In the embodiment shown in FIG. 3, the additional normalization computations may be performed once for each data packet.

This embodiment may be desirable when channel delay spreads increase, as pre-corrupted codewords may differ in the energy they contain, and bias the block detector inappropriately. Block detector 300 may be used in place of the block detector in the DFE of FIG. 2 in certain embodiments. Alternately, block detector 300 may be used with a differently designed DFE, a rake receiver, or other receiver of block-coded transmissions.

Figure 4:
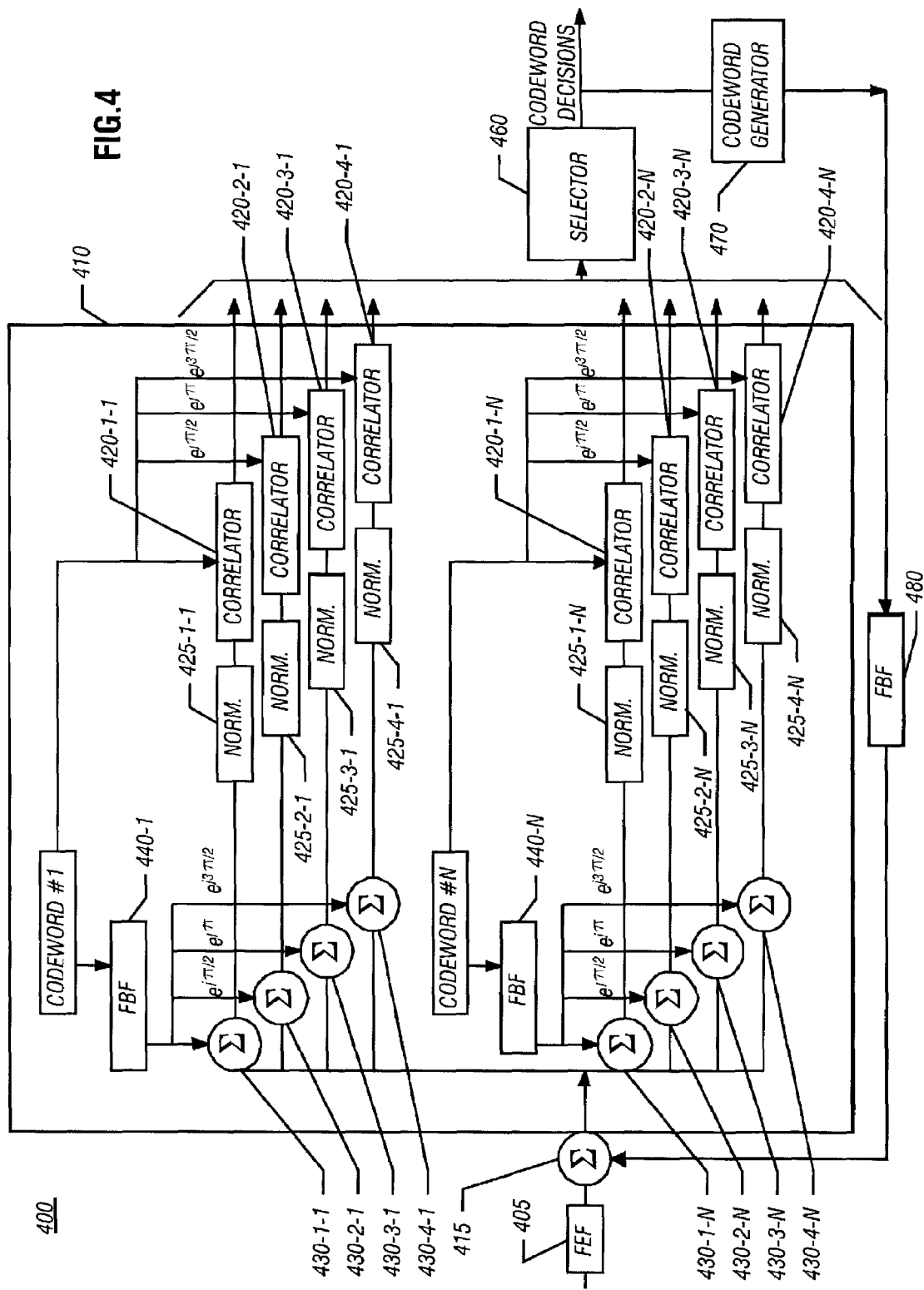
FIG. 4 is a block diagram of a decision feedback equalizer in accordance with yet another embodiment of the present invention.

Referring now to FIG. 4, shown is a block diagram of a DFE using a block detector in accordance with a third embodiment of the present invention. As shown in FIG. 4, DFE 400 includes front end filter 405, combiner 415, correlator unit 410, codeword selector 460, symbol generator 470 and feedback filter 480. In the embodiment shown in FIG. 4, front end filter 405 may be a channel matched filter or a feed forward filter with a whitened causal response. In certain embodiments, DFE 400 may not include any front end filter.

While it is to be understood that correlator unit 410 includes a bank of correlators each associated with one codeword of the codeword set, for ease of reference the following discussion refers to the components associated with codeword #1. As shown at the top portion of FIG. 4, correlator unit 410 may include combiners 430-1-1 to 430-4-1 associated with codeword #1 (generically referred to as "combiner 430"). Combiners 430 may be coupled to receive an output of FIR feedback filter 440-1 having a preselected phase (i.e., combiner 430-1-1 receives 0 degree outputs, combiner 430-2-1 receives 90 degree outputs, and so forth). Combiners 430 may also be coupled to receive the input signal. Feedback filter 440-1 may also be coupled to receive codeword #1 of the codeword set.

The output of combiners 430 may be coupled to a respective normalizer 425-1-1 to 425-4-1 (generically referred to as "normalizer 425"). Normalizers 425 in turn may be coupled to a respective correlator 420-1-1 to 420-4-1 (generically referred to as "correlator 420"). Correlators 420 may also be coupled to receive a different phase of codeword #1 as a reference signal. It is to be understood that components corresponding to the remaining codewords #2 to N of correlator unit 410 operate in similar fashion.

Correlator unit 410 of FIG. 4 differs from the correlator units of other embodiments in a number of respects. First, prior to being input to respective correlators 420-1 to 420-4, codewords #1 to N are not pre-corrupted with expected intra-codeword interference. Instead, the raw codewords are fed as reference signals to the respective correlators 420-1 to 420-4. Second, feedback filters 440-1 to 440-N may remove interference from the input signals. Thus correlators 420 operate to compare the actual codeword as a reference signal to an input signal with both inter-codeword interference and intra-codeword interference removed. Correlator unit 410 also differs from other embodiments in that four correlators (and thus combiners and normalizers) may be associated with each codeword. However, it is to be understood that in other embodiments, a single correlator, normalizer and combiner for each associated codeword may be provided as shown in earlier embodiments. In other aspects correlator unit 410 may operate in similar fashion to the embodiments described above. The outputs from correlator unit 410 may be processed similarly to that discussed above with respect to FIG. 2, for example.

In the embodiment shown in FIG. 4, the normalization computations may be required to be performed once per transmitted codeword, whereas in the embodiment of FIG. 3, such computations may be made once per packet communication. Thus the embodiment of FIG. 4 may be computationally more expensive than the embodiment of FIG. 3.

Figure 5:
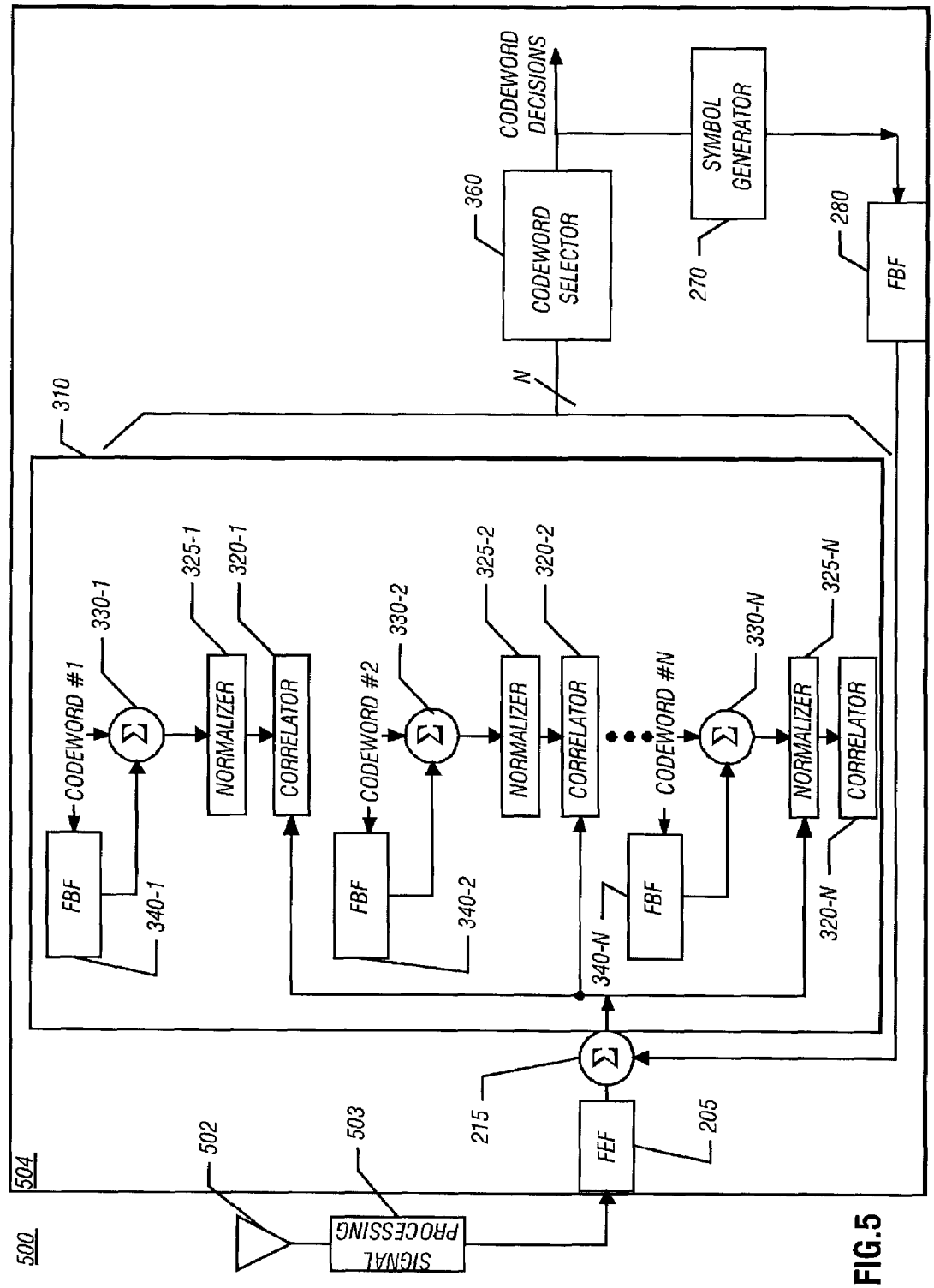
FIG. 5 is a block diagram of a receiver in accordance with one embodiment of the present invention.

FIG. 5 is a block diagram of a receiver according to one embodiment of the present invention. As shown in FIG. 5, receiver 500 may include an antenna 502, signal processing circuitry 503, and a DFE 504. As shown in FIG. 5, DFE 504 may be a decision feedback equalizer that uses block detector 300 of FIG. 3 in the decision feedback equalizer of FIG. 2. Thus the numerical designations therein indicate components identical to those discussed above regarding FIGS. 2 and 3. However, in other embodiments, a receiver may include other DFE's or other signal processing circuitry.

In the embodiment of FIG. 5, antenna 502 may be a broadband helical antenna, parabolic grid, dipole, global system for mobile communication (GSM) or another such antenna. After receipt by antenna 502, radio frequency (RF) processing may be performed in signal processing circuitry 503. Such processing may include, for example, filtering and mixing, amplification, and analog to digital conversion. The output from signal processing circuitry 503 may be a baseband signal. While not shown in FIG. 5, this baseband signal may have further signal processing performed thereon via conventional signal processing techniques before being input into DFE 504. Such pre-processing may include, for example, amplification of the signal via an automatic gain control (AGC) circuit, carrier symbol and codeword synchronization, and/or other signal processing. It is to be understood that DFE 504 may operate in like fashion to DFE 200 discussed above, including normalization provided by block detector 310. In one embodiment, receiver 500 may be implemented within a wireless interface.

Certain embodiments may be implemented in software. As such, these embodiments may be stored on a storage medium having stored thereon instructions which can be used to program a data processing device, such as a computer system, receiver, wireless interface, programmable radio, or the like, to perform the embodiments. The storage medium may include, but is not limited to, any type of disk including floppy disks, optical disks, CD-ROMs, CD-RWs, and magneto-optical disks, semiconductor devices such as ROMs, RAMs, EPROMs, EEPROMs, magnetic or optical cards, or any type of media suitable for storing electronic instructions. Similarly, embodiments may be implemented as software modules executed by a programmable control device. A programmable control device may be a computer processor or a custom designed state machine, for example.

Figure 6:
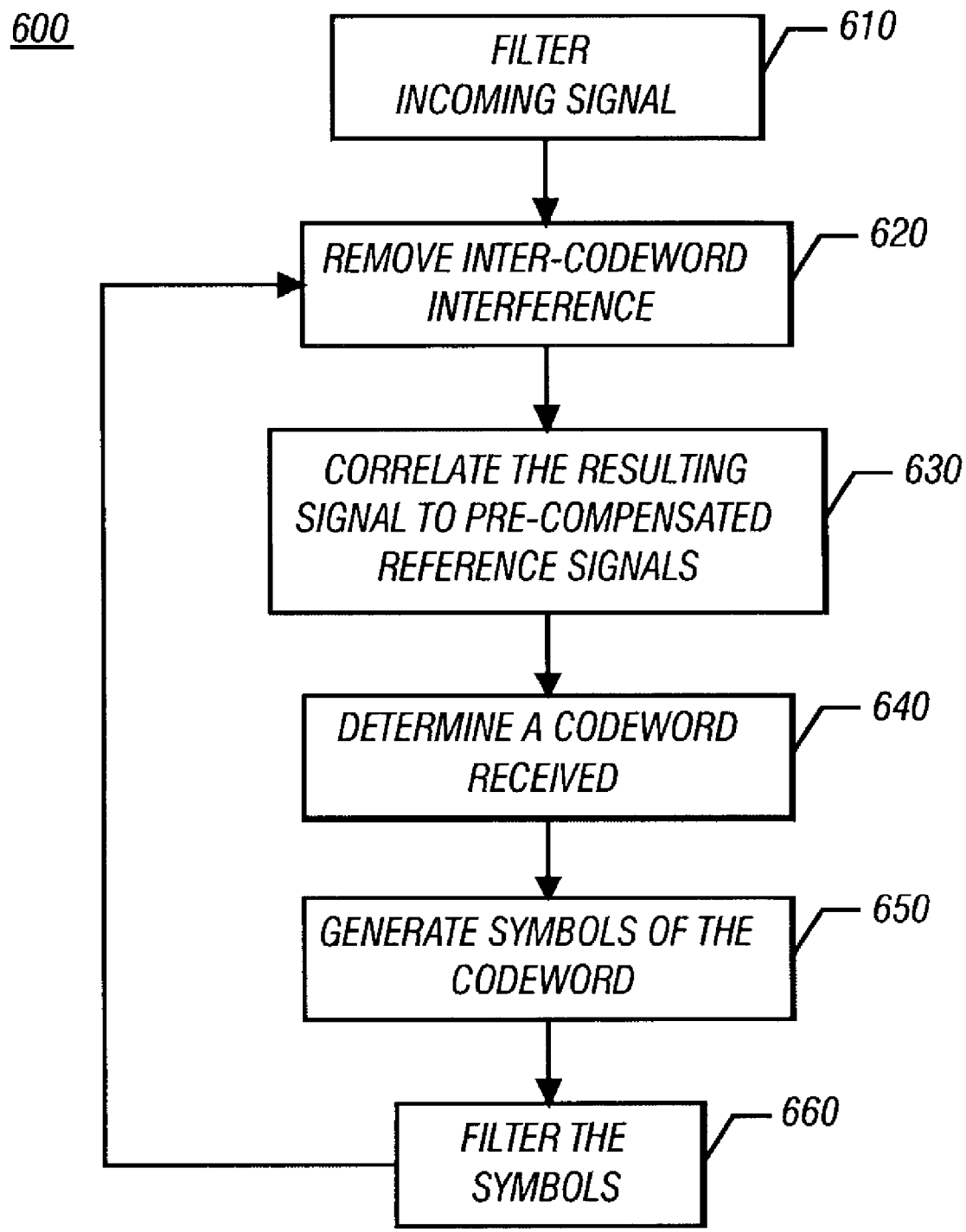
FIG. 6 is a flow chart of an example module in accordance with one embodiment of the present invention.

Referring now to FIG. 6, shown is a flow chart of an example module according to one embodiment of the present invention. As shown in FIG. 6, module 600 begins with the filtering of an incoming signal (block 610). As discussed above, the incoming signal may be obtained after conventional signal processing, and may be filtered using a front end filter. In one embodiment, such filtering may generate a signal having whitened noise and a causal response. Next, inter-codeword interference may be removed from the resulting causal response (block 620). The resulting signal may then be correlated with pre-compensated reference signals (block 630). In one embodiment, the reference signals may be pre-compensated for intra-codeword interference, as discussed above. In certain embodiments, the pre-compensated reference signals may also be normalized, also discussed above.

From the correlation outputs, a determination may be made of the codeword received (block 640). A signal representative of the codeword received may then be passed along for further processing (not shown in FIG. 6). Furthermore, the codeword decision may be used to generate symbols corresponding to the codeword received (block 650). These symbols may then be filtered (block 660) using a feedback filter and the resulting output may be used to remove inter-codeword interference (discussed above at block 620).

Figure 7:
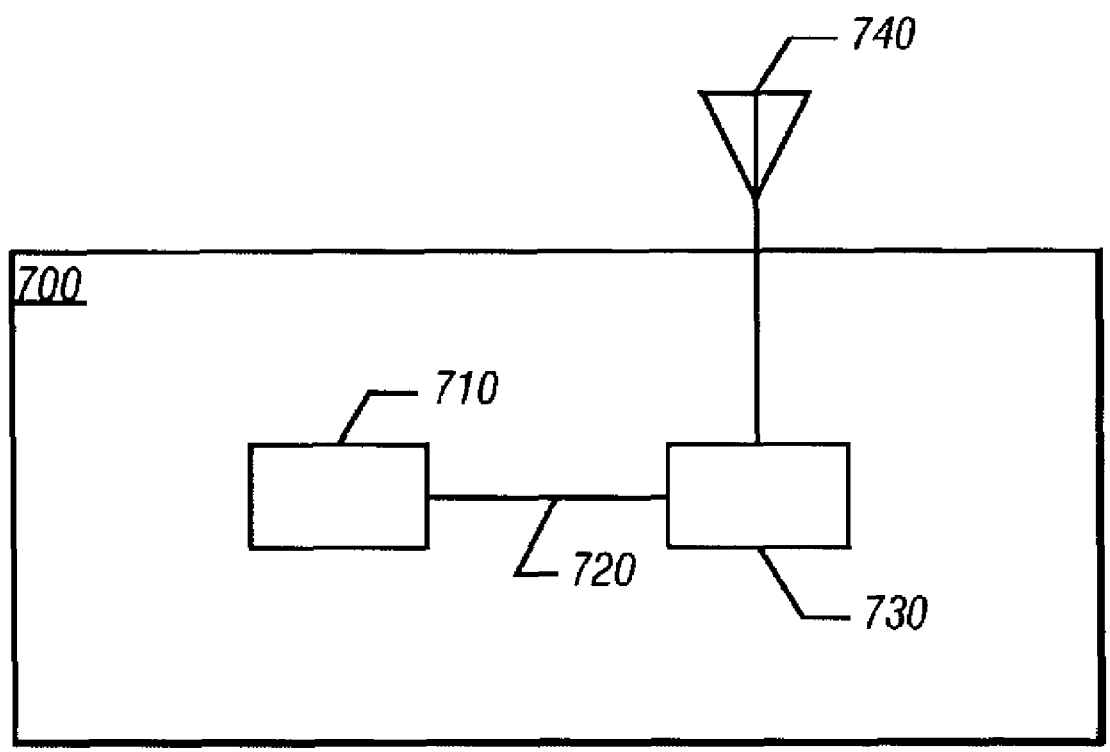
FIG. 7 is a block diagram of a system in accordance with one embodiment of the present invention.

Referring now to FIG. 7, shown is a block diagram of a system in accordance with one embodiment of the present invention. As shown in FIG. 7, system 700 may include a processor 710, a bus 720, a wireless interface 730 and an antenna 740. In one embodiment, system 700 may be a personal computer, such as a desktop or laptop computer. Processor 710 may be a general purpose processor, a digital signal processor, or an application specific integrated circuit (ASIC), for example. Wireless interface 730 in one embodiment may be implemented using a decision feedback equalizer. In one such embodiment, the decision feedback equalizer may be that shown in FIG. 2. Furthermore, in certain embodiments such a decision feedback equalizer may also include normalizers, as shown in the block detector of FIG. 3. As shown in FIG. 7, wireless interface 730 is connected to processor 710 by bus 720. Furthermore, receiver 740 may be connected to wireless interface 730. In various embodiments antenna 740 may be a dipole antenna, helical antenna, GSM antenna or the like. While not shown in FIG. 7, it is to be understood that various intermediate signal processing may occur between antenna 740 and wireless interface 730 in certain embodiments. In operation, signals received by antenna 740 and detected using wireless interface 730 may be provided to processor 710 for processing.

The embodiments of the present invention may benefit from significant performance and computation advantages. As discussed, certain embodiments remove inter-codeword interference and correlate the result against all possible codewords pre-corrupted with the remaining intra-codeword interference. In so doing, embodiments of the present invention may permit reduced packet error rates, significantly extended reach at currently acceptable packet error rates, and a higher percentage of transmissions that take advantage of an 11 Mbps data transmission rate.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a feed forward filter to receive incoming signals;
    a first combiner coupled to receive an output of the feed forward filter;
    a correlator unit to generate a set of correlator outputs, the correlator unit having a plurality of correlators each coupled to receive an input signal from an output of the first combiner and one of a plurality of reference signals, each of the reference signals pre-compensated with expected intra-codeword interference of an associated codeword of a codeword set, wherein the correlator unit comprises a bank of filters, each bank comprising a filter coupled to receive the associated codeword, a second combiner coupled to receive the associated codeword and an output of the filter, and one of the plurality of correlators coupled to receive outputs of the first combiner and the second combiner; and
    a codeword selector coupled to the set of correlator outputs to determine a received codeword therefrom.

2. The apparatus of claim 1, further comprising a symbol generator coupled to an output of the codeword selector.

3. The apparatus of claim 2, further comprising a feedback filter having an input coupled to an output of the symbol generator and an output coupled to the first combiner.

4. An apparatus comprising:
    a front end filter to receive an incoming signal;
    a first combiner coupled to an output of the front end filter;
    a correlator unit coupled to an output of the first combiner, the correlator unit having a plurality of banks, each comprising a codeword of a codeword set, the codeword coupled to a first feedback filter and a second combiner, an output of the first feedback filter coupled to the second combiner, a correlator to receive the output of the first combiner and an output of the second combiner;
    a codeword selector coupled to an output of each of the plurality of banks of the correlator unit;
    a symbol generator coupled to an output of the codeword selector; and
    a second feedback filter coupled to receive an output of the symbol generator, and having an output coupled to the first combiner.

5. The apparatus of claim 4, further comprising a plurality of normalizers, each coupled between the second combiner and the correlator of each of the plurality of banks.

6. The apparatus of claim 4, wherein the front end filter comprises a feed forward filter having a causal response.

* * * * *